Dec. 9, 1958  G. S. ADAMS, JR  2,863,491
BONDING PRESS
Filed June 14, 1951  3 Sheets-Sheet 1

INVENTOR:
George S. Adams, Jr.
BY

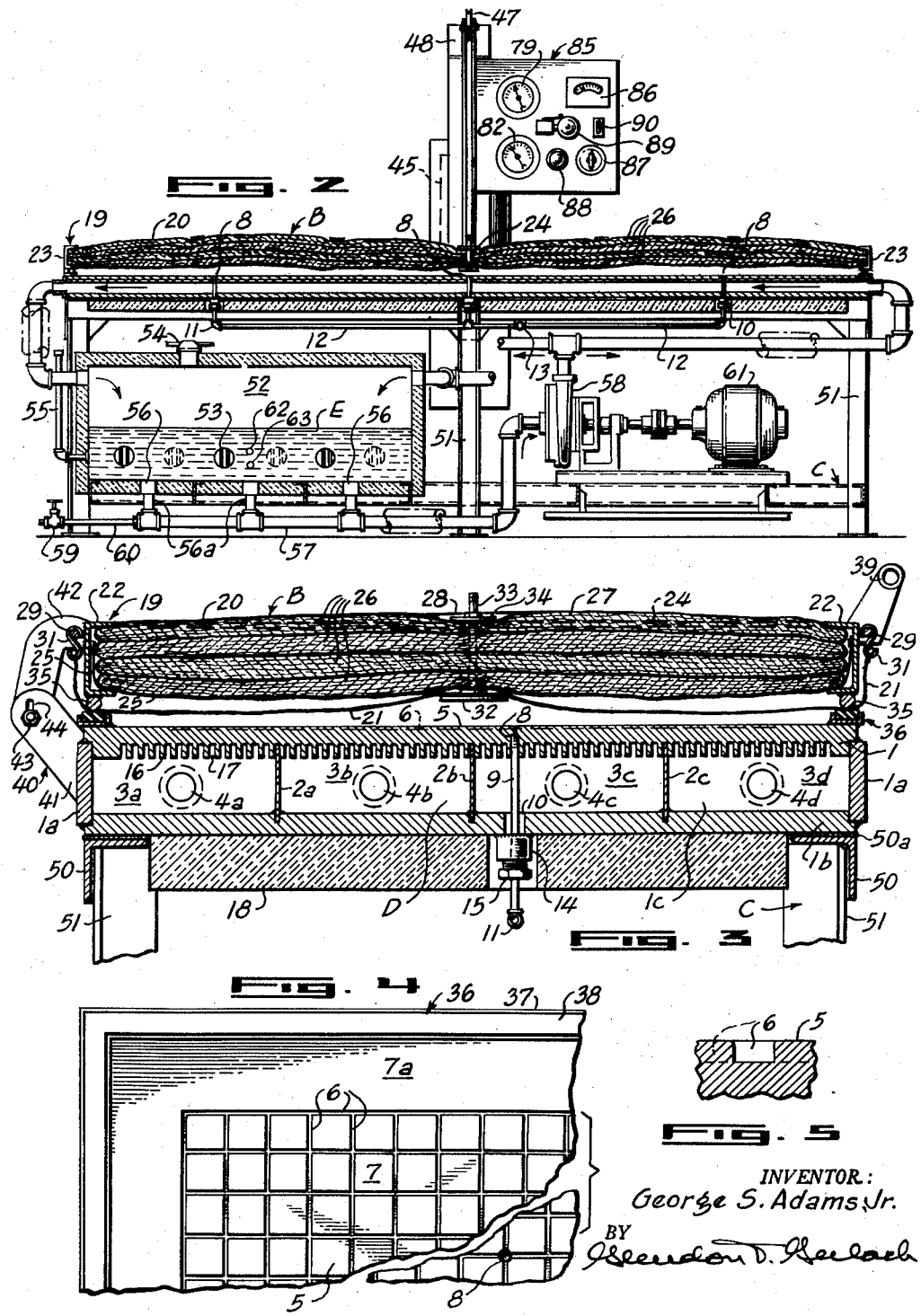

Dec. 9, 1958     G. S. ADAMS, JR     2,863,491
BONDING PRESS

Filed June 14, 1951     3 Sheets-Sheet 3

INVENTOR:
George S. Adams, Jr.
BY

United States Patent Office 2,863,491
Patented Dec. 9, 1958

2,863,491

BONDING PRESS

George S. Adams, Jr., Fort Worth, Tex., assignor, by mesne assignments, to General Dynamics Corporation, a corporation of Delaware Application June 14, 1951, Serial No. 231,614

2 Claims. (Cl. 154—1)

The present invention relates to an improved press for bonding materials with pressure-heat sensitive structural adhesives. More particularly the invention comprises a mechanical apparatus especially adapted for bonding formed sheet metal components into composite assemblies by the application of controlled heat and pressure to cure pressure-heat sensitive bonding adhesive material which has been interposed between the faying surfaces of the work pieces. The press of the present invention is particularly adaptable to the bonding process described in Serial No. 162,698, filed May 18, 1950 to J. W. Larson, et al., now Patent No. 2,650,185, and in connection with the structural bonding adhesive described in Serial No. 150,882, filed March 21, 1950 to N. H. Simpson, et al., now Patent No. 2,607,709, although its use is in no manner limited thereto.

The structural bonding of components of metal or other materials by pressure-heat sensitive adhesives is usually accomplished in relatively large atmosphere ovens, the work being supported on oven dollies or pressure fixtures which are movable into the ovens on rails. This means of applying pressure and heat to effect the bonding is costly from an operational standpoint, and requires excessively large capital expenditures. A further disadvantage of this method lies in the difficulties of controlling the temperature at the faying surfaces of the work being bonded, since the masses of the surrounding structures and supporting fixtures must be brought to and maintained within the relatively critical curing temperature range of the adhesive material.

In this conventional method the work is held against a relatively thick steel platen by means of a vacuum-pressure blanket. This platen and other supporting structure must be completely heated in the furnace before polymerizing the adhesive material to insure uniformity of bond. The "soaking" period thus necessitated is dependent on the operator's skill and experience and is always subject to undesirable variations. Each time the oven is loaded or unloaded, the heat balance becomes upset due to heat losses from the oven resulting in an interruption in production until the operating conditions of the oven are again stabilized. Other operational disadvantages reside in the immobility of large commercial ovens of this nature and in the excessive amount of productive floor area required.

In distinction to the ovens used in the conventional methods described above, the present invention contemplates a relatively small and semi-portable unitary press assembly comprising a horizontally supported heated platen and a vertically movable vacuum bag assembly adapted to fit over and be sealed against the upper face of the platen. The work to be bonded is supported on the platen with pressure-heat sensitive adhesive, preferably in tape or dry-film form, interposed between the faying surfaces. The vacuum bag assembly is then lowered against the work and over the platen and the adhesive is cured to bond the parts under the combined action of heat and pressure. Similar presses have been proposed for gluing or laminating operations but the present press is characterized and distinguishes from these known types of presses by the particular means in which the platen is heated to produce accurately controlled and uniform temperatures at the bonding surfaces, as well as the means for controlling the pressures to which they are subjected. The press contemplated by the present invention is relatively inexpensive in first cost and cost of maintenance, and the time cycle for performing the bonding operations is reduced since the temperature of the apparatus is accurately maintained while it is in use and consequently no "soak" periods are required between work cycles. This is accomplished in the present invention through the use of a platen of novel construction in which heat transfer fluid is continually circulated from a self-contained source to effect uniform heating of the platen in an efficient manner.

Thus the primary object of this invention is to provide an improved unitary and self-contained mechanical press adapted for the simultaneous application of pressure and heat for curing pressure-heat sensitive adhesives that have been interposed between the faying surfaces of components within the press for bonding them together.

Another object of the invention is to provide a press of the above type and character that is adapted for the accurate and controlled application of heat to assembled components for bonding purposes.

A still further object of the invention is to provide a unitary press that is adapted to apply uniform pressures to the adhesive-filled faying surfaces of the work pieces by means of an impervious, flexible, and heat resistant blanket under the influence of controlled fluid pressures.

A further object of the invention is to provide a mechanical press of the above type for bonding operations, which materially reduces the time previously required for the curing cycle and minimizes the preparatory time between curing cycles.

Another object is to provide a pressure-heat applying apparatus for bonding that is a relatively small, compact, and self-contained unit; that requires only a small floor area and which may be easily installed or moved to other location.

Other objects reside in greater efficiency and economy of operation in that related and ancillary operations are simplified.

These and other objects and advantages of the present invention will be more fully apparent from the following description and the drawings, in which like numerals of reference denote like parts throughout the several views.

In the drawings:

Fig. 2 is a longitudinal vertical section taken on line II—II of Fig. 1.

Fig. 3 is a transverse vertical section through the platen and cover with the cover supporting means and instrument panel omitted, taken on line III—III of Fig. 1.

Fig. 4 is a partial plan view of the platen of the invention showing in detail the grooved vacuum grid arrangement and the location of the lower vacuum seal means.

Fig. 5 is a view showing the cross-sectional shape of the vacuum grid grooves illustrated in the grid plan of Fig. 4.

Figure 1:
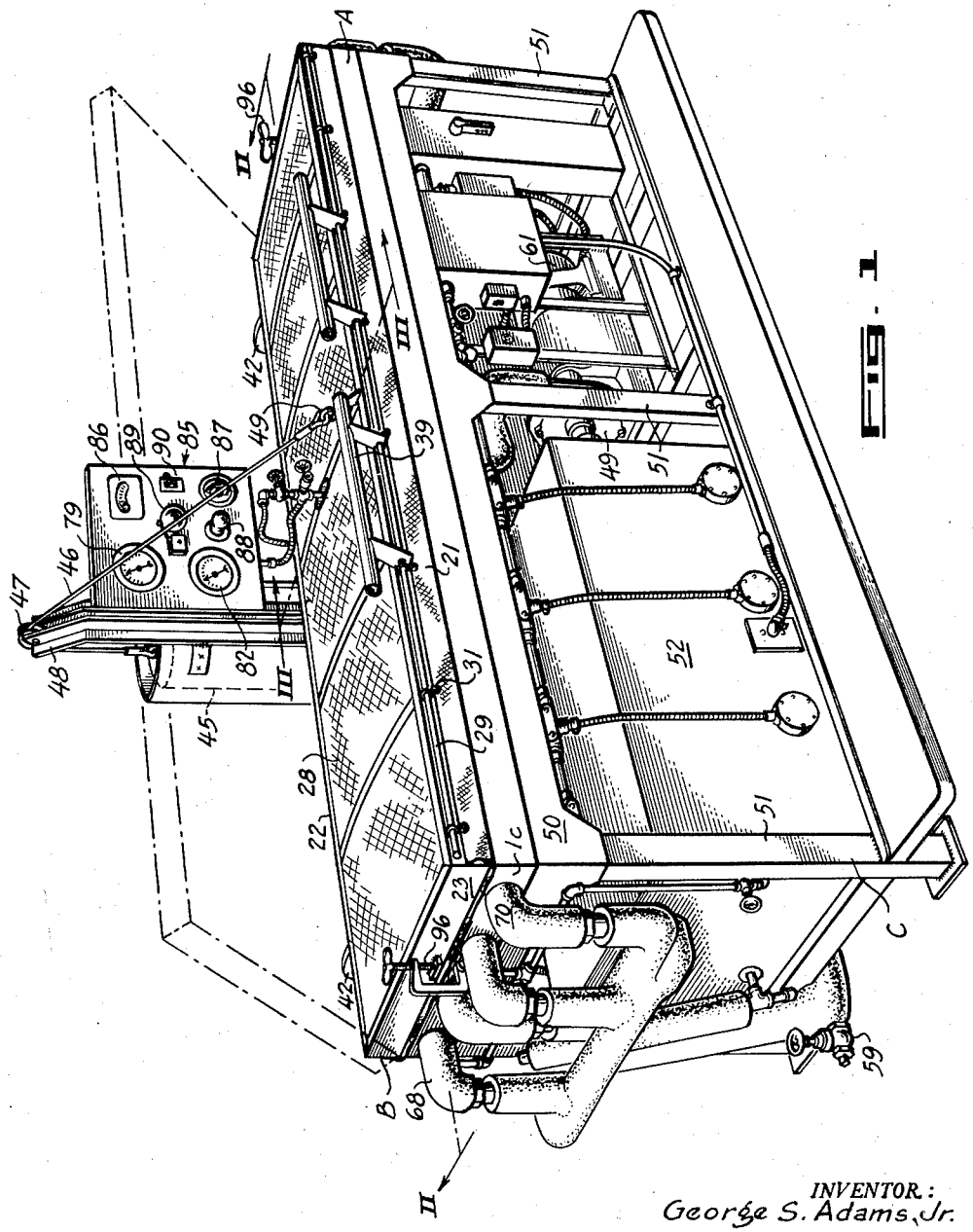
Fig. 1 is a perspective view of the press of the present invention, showing the relative disposition of the major components.

As illustrated in the drawings, in its preferred form, the bonding press contemplated by the present invention comprises essentially a platen assembly A, a cover assembly B, and a supporting structure C.

Referring now to Figs. 1, 2, and 3, the platen assembly A is a hollow, box-like structure of any desired size but preferably rectangular, formed of a top plate 1, having an upper work-supporting surface, a pair of side walls 1a, a pair of end walls 1c and a bottom plate 1b integrally joined together as by welding to form a fluid tight internal chamber D. The chamber D is longitudinally divided by relatively thin, solid partitions 2a, 2b, and 2c extending between and secured to the top plate 1, the bottom plate 1b and abutted against the end walls 1c, to define four separate parallel fluid flow conduits or passages 3a, 3b, 3c, and 3d. Openings 4a, 4b, 4c, and 4d in the end walls 1c are provided at the approximate geometric center of each end of the conduits 3a, 3b, 3c, and 3d respectively.

The central portion of the upper surface 5 of the top plate 1 is provided with a series of parallel and intersecting grooves 6 forming a vacuum grid 7 as shown in Fig. 4. The grooves 6 are spaced at equal intervals longitudinally, and transversely. Both longitudinal and transverse grooves 6 terminate adjacent the edges of the top plate 1 to leave a substantially flat and smooth surface 7a around the periphery of the upper surface 5. An enlarged cross-section of one of the grooves 6 is illustrated in Fig. 5. Typically, each groove 6 is identical and has a width approximately twice its depth and a maximum dimension of approximately one sixteenth of an inch.

A plurality of spaced, threaded apertures 8 are provided in the top plate 1, three being shown in the present embodiment. Each of the apertures 8 is located at the intersection of two of the grooves 6 and extends through the top plate 1. Vertical tubes 9 (Fig. 3) are accommodated and secured at their upper ends in the threaded apertures 8, and extend downwardly through aligned openings 10 in the bottom plate 1b. The apertures 8 are preferably located in the vacuum grid system 7 in such a manner as to be centrally located in approximately equal sections and thus to define three evacuation areas in said grid system 7.

The lower ends of the tubes 9 are threaded to accommodate fittings 11 which are interconnected by pipes 12 (Fig. 2) to form a common manifold. A fitting 13 in one of the pipes 12 provides a connection to a source of reduced fluid pressure as will be described more fully. A packing bonnet 14 is secured to the lower side of the bottom plate 1b beneath each of the openings 10, through which the tubes 9 extend. Each packing bonnet 14 is internally threaded to accommodate a packing nut 15. Conventional high-temperature packing is retained within the packing bonnet 14, and under compression from the nut 15 forms a fluid-tight gland around each of the tubes 9.

The lower surface 16 of the top plate 1 is formed with a series of integral spaced longitudinal ribs 17 which serve to increase the efficiency of the top plate 1 as a heat-transfer element.

A layer of insulation 18, such as a two inch thick layer of 85% block magnesia, is secured to the lower surface of the bottom plate 1b by cementing or in other convenient manner.

The cover assembly B consists essentially of a frame 19 pivotally supported on the platen assembly A, housing an insulating assembly 20 and serving as a support for a vacuum seal blanket 21. The frame 19 conforms in outer dimensions to the platen assembly A, and is formed by a pair of longitudinal channel members 22 and a pair of end channel members 23 secured together as by welding with the flanges of the channels extending inwardly. The frame 19 may be suitably braced by corner gussets, and a flat transverse brace 24 is welded across the upper flanges of the longitudinal channels 22 on the transverse center line. A sheet of light-weight insulating material such as asbestos cloth is attached as a supporting web 25 by riveting along its lateral edges to the inside surfaces of the webs of the longitudinal channel members 22, in such a manner that it normally hangs in a depressed position substantially in the plane of the lower flanges of the channel members 22 and 23. Supported on the web 25 and within the flanges of the channel members 22 and 23 are a plurality of superimposed layers 26 of a good grade of insulating material such as glass fiber blankets to approximately the full height of the channel members 22 and 23. To protect the insulation layers 26, a protective web of asbestos cloth 27 is secured across the upper surfaces of the channels 22 and 23 forming the frame 19, and this in turn is secured by a layer of hardware cloth or screen 28 similarly attached along its edges to the frame 19 over the entire cover assembly B for mechanical protection.

A pair of support rods 29 are secured along the outer faces of the webs of the longitudinal channels 22 as by welding, so that they are spaced slightly therefrom. The vacuum blanket 21 formed of flexible, impervious, and heat-resistant material such as woven glass fiber cloth impregnated and coated with a suitable neoprene or silicone rubber compound is suspended and supported across the lower surface of the cover assembly B by means of spaced hooks 31 passing through reinforced holes in its transverse edges, which fit over and are carried upon the support rods 29. The vacuum blanket 21 is of sufficient size to fit loosely over the lower surface of the frame 19 and to extend several inches on either side of the longitudinal edges thereof. As described, it will be apparent that the construction of the cover assembly B is such as to allow the insulation layers 26, the web 25, and the vacuum blanket 21 to be deformed upwardly when the cover assembly B is in closed position over work pieces supported on the top plate 1.

A vacuum connection to the lower side of the vacuum blanket 21 is provided consisting of a circular disk 32 having radial grooves on its lower face converging to a tapped hole at its center which accommodates a vertical pipe 33 adapted to pass through aligned holes in the geometric center of the cover assembly B through the vacuum blanket 21, the insulating layers 26 and a slotted hole in the transverse brace 24. A threaded washer on the upper side of the vacuum blanket 21 is adapted to be screwed down against the upper face of the disk 32 to compress therebetween the vacuum blanket 21 and thus form an airtight connection around the pipe 33. A washer 34 is brazed to the upper end of the pipe 33 above the transverse brace 24 to support the pipe 33 therein.

A rod 35 is welded around the lower edge of the frame 19 on the flanges of the channel members 22 and 23. The rod 35 is positioned to cooperate with a lower sealing strip 36 secured to the periphery of the top plate 1 when the cover assembly B is lowered upon the platen assembly A to form a seal between these two members with the vacuum blanket 21 interposed between. As shown particularly in Fig. 4, the lower sealing strip 36 comprises a channel member 37 welded or otherwise continuously secured around the periphery of the top plate 1 with its flange portions extending upwardly, and between which is positioned a strip of resilient, heat resistant sealing material 38 such as silicone rubber, formed to fit the inside of the channel member 37 and to extend slightly above the flanges thereof. The sealing material 38 may be secured to the inside of the channel member 37 by a heat resistant adhesive such as a silicone rubber cement. When the press is in operation, with the cover assembly B lowered upon the platen assembly A, the rod 35 coincides with the upper surface of the lower sealing strip 36 around the periphery of the top plate 1 to form a continuous vacuum seal between the upper surface of the top plate 1 and the lower surface of the vacuum blanket 21.

The cover assembly B is hinged to the platen assembly A to permit the former to be swung upward and rearward from the latter for loading the press with the work pieces. For this purpose, elongated handle members 39 are welded to the outer face of the longitudinal channel member 22 forming the front of the frame 19, and two or more pin-type hinges 40 are provided between the cover assembly B and the platen assembly A on their rear edges. The hinges 40 consist of a lower arm 41 attached as by welding to the rear side 1a of the platen assembly A and upper arm members 42 welded to the longitudinal member 22 forming the rear edge of the frame 19. Bolts 43 secured in the upper arms 42 are adapted to pass through slots 44 in the lower arms 41 permitting some degree of vertical freedom between the platen assembly A and the cover assembly B while restraining these elements horizontally. The vertical freedom permitted in the hinges 40 by the slots 44 provides automatic and even contact of the rods 35 against the lower sealing strip 36 when the cover assembly B is in closed and operative position.

The cover assembly B is counterbalanced by means of a counter weight 45 (Fig. 1) attached by means of a cable 46 running over a pulley 47 which is supported for rotation on the upper end of a back post 48. The back post 48 is suitably secured to the support structure C. The cable 46 is attached at its forward end to the cover assembly B on the transverse center line of the latter and forward of its center of gravity by means of a lug 49. The counterweight 45 is adjusted so that the cover assembly A may be readily raised manually. If desirable, the counterweight 45 may be eliminated and the cover assembly B made operable by mechanical power means such as air cylinders. By this latter arrangement, the full weight of the cover assembly B may be made effective against the vacuum seal.

The support structure C is preferably formed from structural steel shapes and comprises essentially an upper frame 50 on which the platen assembly A is adapted to rest, and a series of vertical legs 51 having sufficient height to maintain the working space of the press convenient for its operation. As shown in Fig. 3, the platen assembly A is insulated from the upper frame 50 by one or more layers 50a of interposed insulation material such as asbestos.

Adjacent the left end of the press as shown, and supported by the support structure C is a liquid tank 52 adapted to contain a sufficient volume of heat transfer fluid E to completely fill the circulation system of the press and provide an adequate reserve. The tank 52 is insulated on all sides as by a 2" layer of 85% block magnesia.

Disposed within the tank 52 are located a plurality of electric immersion heaters 53 positioned horizontally of the tank 52 and spaced from its sides and bottom, and from each other. In the present embodiment, six of the heaters 53 are employed, being alternately mounted from the front and rear sidewalls of the tank 52.

The tank 52 is provided through its upper wall with a filler neck 54 and a gauge 55 adjacent to and mounted in one side thereof for determining the amount of fluid in the reservoir. A plurality of outlet connections 56 are equally spaced along the longitudinal center line through the bottom wall of the tank 52, three being shown in the present embodiment. It is to be noted that with the illustrated arrangement of heaters 53 and outlet connections 56, the liquid contents of the tank 52 flow through the outlets 56 over the heaters 53 at an approximately equal rate to promote uniformity of temperature.

The outlet connections 56 are connected by branch pipes 56a to a header pipe 57 located beneath the tank 52 which is connected to the suction side of a liquid circulating pump 58. A drain valve 59 is connected to the end outlet connection 56 by a pipe 60. The circulating pump 58 is mounted on suitable framing on the support structure C adjacent the inner end of the tank and is adapted to be driven by a suitable electric motor 61. To insure uniformity of heating of the platen assembly A and to promote speed of operation the capacity of the circulating pump 58 is preferably sufficient to fully circulate the full quantity of heat transfer fluid through the system approximately once each minute. The heat transfer fluid E may be any good grade of synthetic oil such as Ucon #50–HB–280–X as made available by the United Carbide Company or other petroleum base oil capable of withstanding use at the elevated operating temperatures of the press.

Positioned within the liquid tank 52 are two thermostats 62 and 63 supported one above the other on the transverse center line of the tank 52 and above the center outlet connection 56. The thermostat 62 controls a high temperature-limiting heater control circuit which controls the electrical power to the heaters 53. A second thermostat 63 controls a low temperature-limiting heater control circuit which functions to shift the heater circuit from full to partial power, as for example, from full to ¼ power. Thus, in starting the press, the high temperature-limiting thermostat 62 is in control and applies full power to the heaters 53, but during operation the low temperature thermostat 63 controls the application of partial power to maintain the temperature of the heat transfer fluid E within predetermined operating limits. This provision allows the immersion heaters 53 to operate normally at low heat and thus prolongs their service life as well as that of the heat transfer fluid E. The thermostats 62 and 63 are of conventional construction; for example they may utilize electrical contacts activated by bimetallic elements that are adjustable to the desired temperature range of operation.

Figure 6:
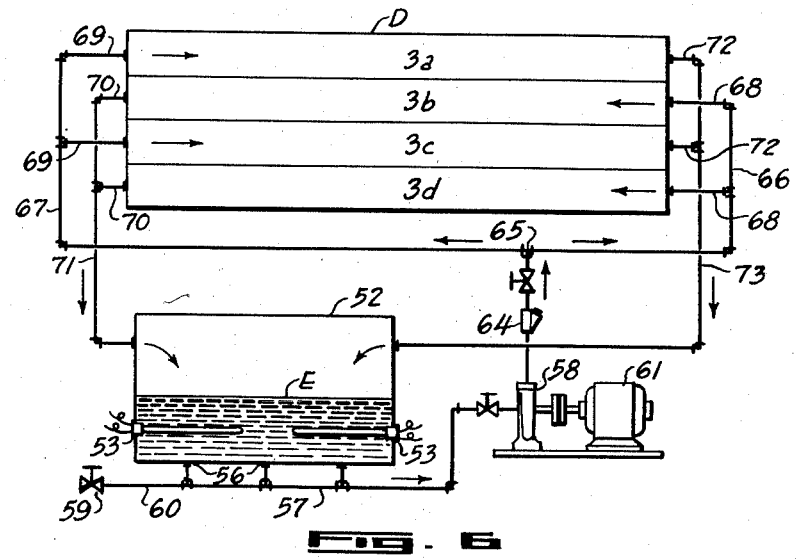
Fig. 6 is a schematic flow diagram of the fluid heat transfer system.

One of the important characteristics of the bonding press contemplated by the present invention resides in the provision for uniform heating of the platen assembly A, which is essential to satisfactory structural bonding of the type under consideration. The means for accomplishing this can best be understood by reference to the schematic piping arrangement and flow diagram of Fig. 6. Heat transfer fluid E normally held within the liquid tank 52 is heated by the heaters 53, and withdrawn from the tank 52 by the circulating pump 58 through the outlet connections 56. On the outlet side of the circulating pump 58 the heat transfer fluid E passes through a strainer 64 to a T connection 65 where the flow is equally divided between an intake manifold 66 connected to one end of the platen assembly A, and to an intake manifold 67 connected to the other end thereof.

The flow through the manifold 66 is further divided adjacent one end of the platen A through a pair of branch pipes 68 which are connected to the flow conduits 3b and 3d through the corresponding openings 4b and 4d. Similarly, the flow through the manifold 67 is divided adjacent the other end of the platen A through a pair of branch pipes 69 connected to the flow conduits 3a and 3c through the corresponding openings 4a and 4c. The outlet ends of the flow conduits 3b and 3d are provided with branch pipes 70 which feed into a return manifold 71 connected to the tank 52. In similar manner, the outlet ends of the flow conduits 3a and 3c are provided with a pair of branch pipes 72 feeding into a return manifold 73 which is connected to the tank 52. This piping arrangement results in alternating intake and outlets at each end of the platen assembly A, thus providing single-pass counter-flow fluid heat transfer means through the internal chamber D of the platen assembly A, and providing uniform platen temperatures over the entire upper surface thereof. To further promote uniform heating and to reduce heat loss, all of the piping associated with the bonding press of the present invention is preferably covered with a good grade of commercial heat insulation such as 85% magnesia pipe covering.

Figure 7:
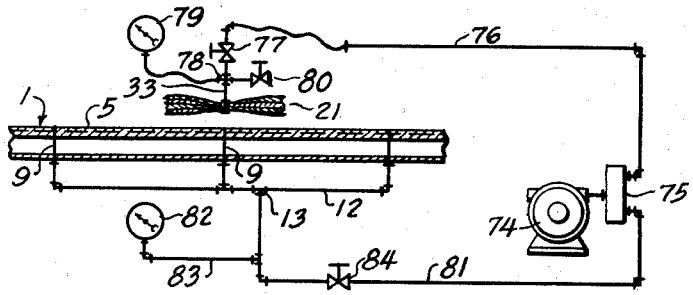
Fig. 7 is a schematic piping arrangement of the vacuum system.

The vacuum system for imparting pressure to the fayed surfaces of the work is illustrated schematically in Fig. 7. While any conventional source of vacuum may be utilized in the operation of the present machine, to the end of providing a self-contained unit it is desirable to utilized an electrically driven vacuum pump 74 integral with the press and supported on the structure C. As illustrated, the vacuum pump 74 is connected to a vacuum tank 75, a pipe 76 connects the tank 75 to a valve 77 which is in turn connected to the pipe 33, on the cover assembly B communicating with the lower side of the vacuum blanket 21. The valve 77 is the operating valve for controlling the vacuum under the vacuum blanket 21, heerinafter referred to as the "upper vacuum." A cross fitting 78 is provided between the pipe 33 and the valve 77 connected to a vacuum gauge 79 for indicating the upper vacuum, and a bleed valve 80 by which the upper vacuum may be reduced from that in the tank 75.

A pipe 81 is connected to the tank 75 and to the fitting 13 in the manifold pipe 12 for imparting to the lower side of the work when placed on the platen 1 a negative pressure hereinafter referred to as the "lower vacuum." A gauge 82 is connected to the pipe 81 for indicating the value of the lower vacuum, by a branched pipe 83. A valve 84 is provided in the pipe 81 for controlling the lower vacuum.

Referring to Fig. 1, an instrument panel 85 is supported on the back post 48 to be convenient and within vision of the machine's operator. In addition to the gauges 79 and 82 for indicating the respective values of the upper and lower vacuums, the instrument panel 85 may additionally include an indicating pyrometer 86 operating from a thermocouple embedded in the upper plate 1 for indicating the temperature of the heated platen assembly A; a timer 87 for pre-setting the curing time for the work load; an indicating light 88 as a visual signal for the timer 87; a bell or buzzer 89 as an audible signal for the timer; and a switch 90 for controlling the buzzer 89 as desired by the operator. Obviously additional controls or signals may be added as desired.

Figure 8:
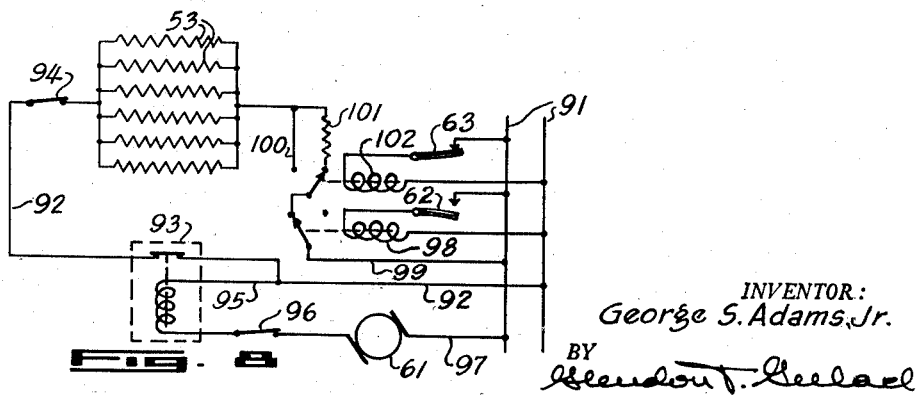
Fig. 8 is a schematic wiring diagram of a typical electric circuit for use in connection with the invention to illustrate the functions and relations of the primary electrical components and controls.

The various primary elements for the electrical circuits of hte present bonding press are indicated in the simplified schematic circuit diagram of Fig. 8 which indicates the bonding press in operating condition.

Referring to Fig. 8, one side of a source of electric power 91 is connected through a conductor 92 through the contacts of a relay 93 and a heater control switch 94 to one side of the bank of heaters 53, which are connected in parallel. A lead 95 connected to the conductor 92 is connected through the coil of the relay 93 and a control switch 96 to the electric motor 61 which drives the pump 58. A lead 97 connects the motor 61 to the other side of the power line 91.

The high temperature limiting thermostat 62 is connected in series with a relay 98 across the power line 91. The relay 98 opens or closes the flow of current from a lead 99 to the bank of heaters 53 either through a branch conductor 100 or through a resistance 101.

The low temperature limiting thermostat 63 is connected in series to control the relay 102 across the power line 91. The relay 102 controls the flow of current from the conductor 99 either through the branch conductor 100 or through the resistance 101. In operation, when the control switch 96 is closed to energize the motor 61 for driving the pump 58 and circulating the heat transfer fluid E, the relay 93 closes to energize one side of the circuit to the heaters 53 through the conductor 92. In this condition, the temperature of the heat transfer fluid E is presumably below the desired operating range. The thermostat 62 is opened and de-energizes the relay 98 to close the contact through the conductor 99 and branch 100 to the other side of the bank of heaters 53. The low temperature thermostat 63 is open de-energizing the relay 102 and closing the circuit between the conductors 99 and 100. Closing the heater switch 94 completes the circuit to the heaters 53 and full power from the supply line 91 for heating the heat transfer fluid E is supplied. When the temperature of the latter reaches the maximum predetermined temperature, the thermostat 62 closes, energizing the relay 98 cutting off the power supply to the heaters 53. With the temperature of the heat transfer fluid E within the predetermined operating range, the low temperature thermostat 63 closes, energizing relay 102 to maintain further flow of current to the heaters 53 through the conductor 99 and resistance 101.

It will thus be seen that the maximum temperature range of the heater circuit is controlled by the thermostat 62 through the relay 98, while the temperature of the heat transfer fluid E is maintained in the normal operating range by the thermostat 63 and relay 102, utilizing only a portion of the available power supplied to the heaters 53 through the resistance 101. The full supply of available energy is only directed to the heaters 53 through the conductor 100 at start of operation and when the temperature of the heat transfer fluid E is below the predetermined minimum temperature.

As thus described, the present invention is characterized as a unitary self-contained bonding press consisting of a platen adapted for continuous and uniform heating by a heat transfer fluid, and an insulated hinged cover structure, including a vacuum blanket, adapted to be lowered over work pieces placed on the upper surface of the platen having faying surfaces with pressure-heat sensitive adhesive material interposed therebetween, and means for imparting pressure to the faying surfaces while under the action of heat from the platen.

In operation, with the circulating pump 58 in operation by actuation of the switch 96, the heaters 53 are energized and automatically controlled by the thermostats 62 and 63 to bring the temperature of the circulating heat transfer fluid E to the required temperature for maintaining the platen A at the desired curing temperature. The circulation of the heat transfer fluid E through the platen assembly A is continuous and heat is added by means of the electrical heaters 53 under the influence of the thermostats 62 and 63 to maintain the temperature within the desired range. When the temperature of the upper surface of the platen 1 is within the desired limits for bonding, as indicated by the pyrometer 86, the cover assembly B is raised to its open position, exposing the heated upper platen 1. The panels to be bonded are placed on the platen 1 with their faying surfaces in desired relationship and with the adhesive material interposed between. The outer edges of the work panels are preferably taped or otherwise sealed against the upper surface of the platen 1. This operation seals off the space between the underside of the work panels and the upper surface of the platen 1. During this operation, the valve 84 controlling the lower vacuum is open subjecting the lower surfaces of the work pieces to reduced pressure from the tank 75 through the vacuum grid 7 causing atmospheric pressure to hold the work panels flat and in positive contact with the platen 1. This maintains the work panels and their joining surfaces in contact with the platen 1 and permits maximum and uniform heat flow into the areas to be bonded. If desired, pressure blocks may be placed over the joints to be cured to permit pressures loading imparted from the vacuum blanket 21 to be concentrated on the areas under bond.

With the work in position as described, the cover assembly B is partially closed, and the vacuum blanket 21 is adjusted evenly over the top of the work panels so that any excess of blanket material extends over and beyond the lower sealing strip 36. The cover assembly B is then fully closed and pressed down firmly causing the rods 35 to bear against the vacuum blanket 21 and against the sealing material 38 around the periphery of the platen 1. The upper vacuum valve 77 is then opened causing the space between the vacuum blanket 21 and the upper surfaces of the work and exposed platen 1 to be evacuated. Atmospheric pressure acting on the upper surface of the vacuum blanket 21 forces the latter firmly and uniformly against the panels and the tops of the pressure blocks, thus creating an even and positive pressure on the areas to be cured. The upper vacuum is adjusted to a slightly lower value than the lower vacuum by means of the bleed valve 80. The differential pressure resulting insures that the greater lower vacuum will maintain the work pieces flat against the platen 1.

As shown in Fig. 1, clamps 96 or similar holding devices may be employed between the platen assembly A and the cover assembly B when in closed position in order to supplement the effective weight of cover assembly B in providing a positive seal against the vacuum sealing strip 36.

With the cover assembly closed and the values of upper and lower vacuum obtained, the desired curing time interval is set on the timer 87. The visual signal 88 and audible signal 89 indicate completion of the curing time. The cover assembly B is then raised to its open position, and the cured and bonded work pieces removed. The bonding press may be immediately reloaded for a repetition of the above work cycle.

As thus described, the bonding press of the present invention is characterized as an improved unitary, semi-portable, press for adjoining parts by means of pressure-heat sensitive adhesive material. It will be apparent that modifications and variations of the embodiment as described herein may be made without departing from the scope of the invention as defined in the appended claims.

I claim:

1. A self-contained bonding press comprising a hollow platen having a work-supporting surface, a frame adapted to support said platen, an insulated cover operatively associated with said platen adapted to be superimposed on said work-supporting surface, said insulated cover comprising a frame and plurality of layers of insulating material supported by said frame, an impervious flexible blanket adapted to be interposed between said platen and said cover, sealing means on said platen adapted to form a sealed space between said blanket and said platen when said cover is in closed position on said platen, a fluid reservoir having a supply means and a return means with said platen, heating means associated with said reservoir for heating a transfer fluid therein, a fluid pump for circulating fluid through said platen and said reservoir, a vacuum pump, first conduit means connected to said vacuum pump communicating with the work-supporting surface of said platen, second conduit means connected to said vacuum pump communicating with the side of said blanket opposing said platen, and means for independently controlling the pressures in said first and second conduit means.

2. A self-contained bonding press comprising a hollow platen, work-supporting surface on said platen, cover means operatively associated with said platen and adapted to be superimposed on said work-supporting surface comprising a frame supporting a plurality of layers of insulating material, an impervious flexible blanket carried by said cover and adapted to be interposed between said cover frame and said platen, sealing means around said platen adapted to engage said blanket and said cover frame to form a seal therebetween when said cover is in closed position over said work-supporting surface, a fluid reservoir, means to circulate fluid through said reservoir and said platen, thermostatically controlled heating means for maintaining the temperature of said fluid within predetermined temperatures, a vacuum pump, first conduit means connected to said vacuum pump communicating with the work-supporting surface of said platen, second conduit means connected to said vacuum pump communicating through said cover frame to the side of said blanket opposed to the work supporting surface of said platen, and means for independently controlling the pressures in said first and second conduit means.

References Cited in the file of this patent

UNITED STATES PATENTS

| | | |
|---|---|---|
| 1,851,028 | Worrall | Mar. 29, 1932 |
| 1,980,022 | Whitehouse | Nov. 6, 1934 |
| 2,088,352 | Vierkotter | July 27, 1937 |
| 2,201,706 | Sukohl | May 21, 1940 |
| 2,363,431 | Moorhouse | Nov. 21, 1944 |
| 2,385,083 | Kemerer | Sept. 18, 1945 |
| 2,385,143 | Levine | Sept. 18, 1945 |
| 2,390,171 | Ratay | Dec. 4, 1945 |
| 2,461,774 | Robertson | Feb. 15, 1949 |
| 2,466,735 | Piazze | Apr. 12, 1949 |
| 2,478,165 | Collins | Aug. 2, 1949 |
| 2,517,701 | Oettinger | Aug. 8, 1950 |
| 2,524,932 | Schulman | Oct. 10, 1950 |